April 24, 1928.
R. A. OSBURN
1,667,489
ANTIGLARE LENS FOR AUTOMOBILE HEADLIGHTS
Filed June 19, 1925
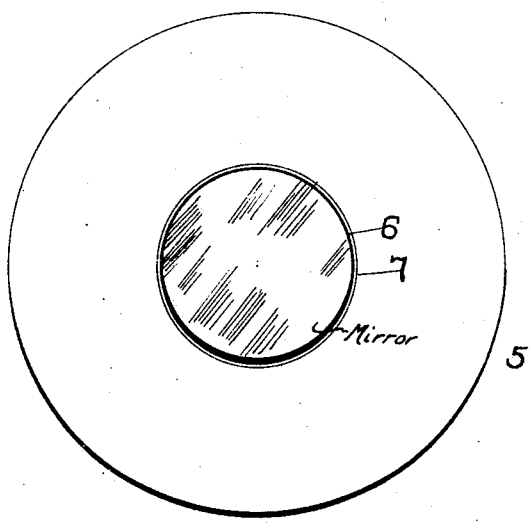
Fig.-1.
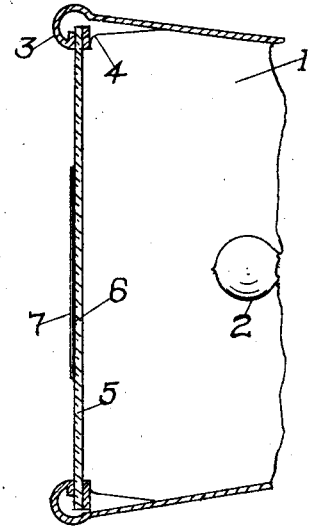
Fig.-2.
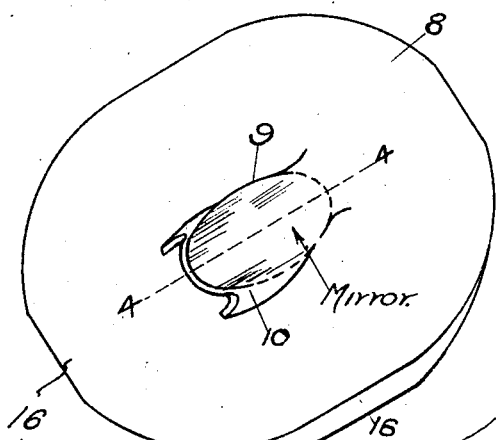
Fig.-3.
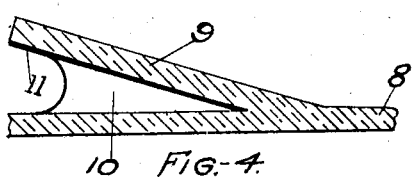
Fig.-4.
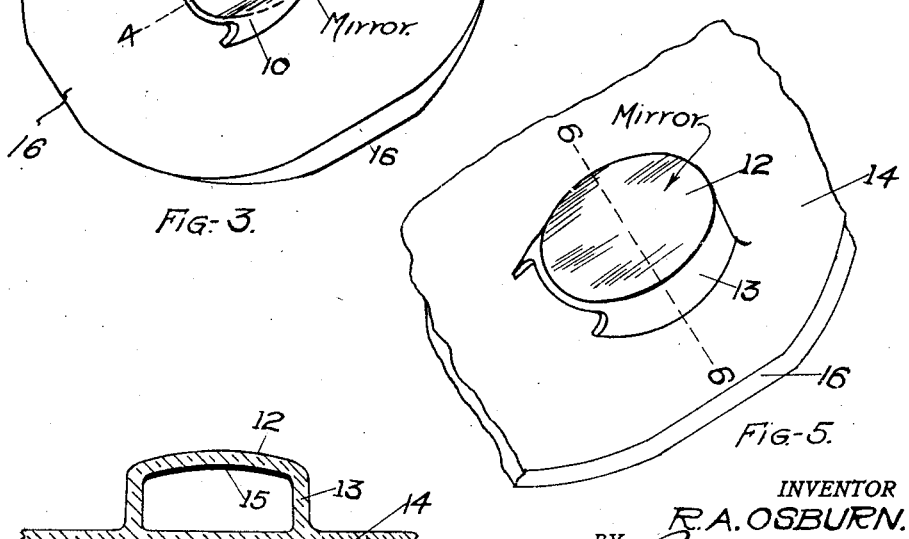
Fig.-5.
Fig.-6.
INVENTOR
R. A. OSBURN.
BY
ATTORNEY Patented Apr. 24, 1928.

1,667,489

UNITED STATES PATENT OFFICE.

ROBERT A. OSBURN, OF BIRMINGHAM, ALABAMA, ASSIGNOR OF ONE-THIRD TO JOHN F. WILLIAMS, OF BIRMINGHAM, ALABAMA.

ANTIGLARE LENS FOR AUTOMOBILE HEADLIGHTS.

Application filed June 19, 1925. Serial No. 38,371.

My invention relates to an improved type of lens adapted to produce an anti-glare effect from headlights, and particularly from the headlights of automobiles.

My invention contemplates the utilization of a mirror or high reflective body carried by, or formed as an integral part of the lens itself and so disposed with relation to the source of light as to prevent the projection of rays which will directly strike the eyes of an approaching driver, and which are adapted to accomplish this important result without appreciably diminishing the efficiency of the headlight itself to illuminate the roadway. In other words, the mirror or highly polished reflecting surface, instead of deadening or absorbing the light rays which directly engage it, will serve merely to deflect them against the walls of the headlight reflector and project them upon the roadway.

My invention constitutes an improvement in my pending application, Serial No. 7,163, in which the deflecting mirror is mounted on a metallic support within the headlight. My present invention contemplates forming the mirror in or as a part of the lens itself.

My invention further comprises the novel details of construction and arrangements of parts, which are hereinafter more particularly described by reference to the accompanying drawings which form a part of this specification, and in which:—

Fig. 1 is a view of a plain lens having a center panel thereof treated to form a mirror.

Fig. 2 is a fragmental cross-sectional view through a headlight equipped with the lens shown in Fig. 1.

Fig. 3 is a perspective view looking at the inner face of a lens having an inclined mirror molded integrally therewith.

Fig. 4 is a cross-sectional view taken on the line 4—4 of Fig. 3.

Fig. 5 is a perspective view corresponding to Fig. 3 of a modified type of mirror which is of oval type disposed parallel with the inner face of the lens.

Fig. 6 is a cross-sectional view on the line 6—6 of Fig. 5.

Similar reference numerals refer to similar parts throughout the drawings.

In the embodiment of my invention illustrated, I show a conventional headlight reflector 1 containing an electric lamp 2 and any suitable type of clamp ring 3 and bracket 4 for mounting a lens therein. It is to be understood that the construction of the headlight and the manner of mounting the lens may vary widely without departure from my invention.

As shown in Figs. 1 and 2 I use a lens 5 plain at its inner surface and I apply preferably within a circle concentric with the lens and on the outer face thereof a suitable silver coating 6 which I cover with a lacquer coating 7 to protect it from the weather. I prefer to form the mirror with a diameter about forty per cent of the diameter of the opening in the headlight reflector, as I find that a mirror of this size will act to intercept the concentrated light rays tending to pass out centrally from the reflector and will throw them back against the reflector so that they will pass out around the marginal edge of the mirror without real loss of lighting efficiency but without the projection of the blinding rays into the eyes of an approaching driver.

In Fig. 3 I show a modification of my invention, in which the mirror is formed in the inner side of a lens 8 which may have its outer surface of any desired conformation. At the center of its inside face I provide an inclined ledge 9 which flares inwardly and downwardly and is supported on the sides by webs 10 integral with the ledge and the lens itself. By this arrangement the outer surface of the ledge, that is to say the surface adjacent to the inside face of the lens, is spaced from the latter face so that it can have applied thereto a silver coating 11 to form a mirror. The action of this mirror differs from that already described in that the direct rays of light striking it will be reflected more to the upper part of the headlight reflector and thence projected more downwardly so as to illuminate the roadway more brilliantly immediately below and in front of the headlight, rather than to project the rays uniformly about the mirror.

In Fig. 5 I show a further modification of the internal mirror, which here is provided with an oval ledge 12 formed integral with and supported by a web of uniform height rising from and integral with the inside face of the lens 14. This web is interrupated below so as to give access to the concave surface of the ledge for the application of a silver coating 15 thereto. The action of this lens will be to deflect the rays more sharply towards the front end of the reflector 1 and gives a very satisfactory distribution of the light without a glare in front of the headlight. Both of the lenses 5 and 8 are provided with flattened edges 16 in order to prevent their displacement by rotation in the headlight.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. An anti-glare lens for headlights having substantially at and confined to the center zone of its inner surface a glass bracket shaped to present an upwardly inclined mirror shelf and a mirror surface on said shelf adapted to reflect the rays of the light striking it upwardly against the headlight reflector, the lens being unobstructed except for said mirror and the bracket support therefor.

2. An anti-glare lens having its outer surface substantially plane and having molded on its inside surface a raised integral downwardly and inwardly inclined reflecting surface which in part is spaced from the lens so as to give access between the lens and said reflector for silvering the latter.

In testimony whereof I affix my signature.

ROBERT A. OSBURN.